US009644431B2

(12) United States Patent
Myers et al.

(10) Patent No.: US 9,644,431 B2
(45) Date of Patent: May 9, 2017

(54) DRILLING RIG SYSTEM HAVING IMPROVED ELECTRICAL SUBSYSTEM

(71) Applicant: Integrated Drive Systems LLC, Houston, TX (US)

(72) Inventors: Norman S. Myers, Spring, TX (US); David Carroll, Pinehurst, TX (US)

(73) Assignee: Integrated Drive Systems LLC, Houston, TX (US)

( * ) Notice: Subject to any disclaimer, the term of this patent is extended or adjusted under 35 U.S.C. 154(b) by 71 days.

(21) Appl. No.: 14/593,776

(22) Filed: Jan. 9, 2015

(65) Prior Publication Data

US 2016/0145947 A1 May 26, 2016

Related U.S. Application Data

(63) Continuation-in-part of application No. 14/554,882, filed on Nov. 26, 2014.

(51) Int. Cl.
 E21B 15/00 (2006.01)
 E21B 19/00 (2006.01)
 E21B 3/02 (2006.01)
 H02J 3/00 (2006.01)
 H02J 3/38 (2006.01)

(52) U.S. Cl.
 CPC .......... *E21B 15/003* (2013.01); *E21B 3/02* (2013.01); *E21B 19/00* (2013.01); *H02J 3/00* (2013.01); *H02J 3/38* (2013.01)

(58) Field of Classification Search
 CPC .......... E21B 15/003; E21B 19/00; E21B 3/02; H02J 3/00; G01R 1/203; G06F 1/26; H01R 29/00; H02M 3/07; H02M 3/1584

USPC .......................................................... 307/154
See application file for complete search history.

(56) References Cited

U.S. PATENT DOCUMENTS

| | | | | |
|---|---|---|---|---|
| 4,260,287 A * | 4/1981 | Uyeda | ..................... | B63B 35/03 242/390.6 |
| 4,945,938 A * | 8/1990 | Ponsford | ................. | B60P 3/035 137/15.01 |
| 9,091,125 B2 * | 7/2015 | Konduc | .................. | E21B 15/00 |
| 2011/0214919 A1 * | 9/2011 | McClung, III | ............ | E21B 3/02 175/57 |
| 2012/0292992 A1 * | 11/2012 | Williams | ................ | F02D 19/10 307/23 |
| 2013/0121846 A1 * | 5/2013 | Gilarranz | ................ | F04D 17/12 417/53 |
| 2013/0285461 A1 * | 10/2013 | Smedley | ................... | H02J 3/00 307/82 |
| 2013/0315676 A1 * | 11/2013 | Orgeron | ................ | E21B 15/003 405/184.4 |
| 2014/0048286 A1 * | 2/2014 | Rojas | ..................... | B65H 75/38 166/379 |
| 2014/0251623 A1 * | 9/2014 | Lestz | ..................... | E21B 43/26 166/308.2 |
| 2015/0343935 A1 * | 12/2015 | Fox | ........................ | B65G 67/04 414/334 |

* cited by examiner

*Primary Examiner* — Thienvu Tran
*Assistant Examiner* — Brian K Baxter
(74) *Attorney, Agent, or Firm* — International IP Law Group, PLLC

(57) ABSTRACT

In embodiments a drilling rig system includes a rig unit having rig equipment and a rig electrical subsystem configured for electrical communication with the rig equipment and including a rig electrical subsystem input transformer, an electrical system including a primary power supply subsystem remote from the rig unit, and an intermediate electrical subsystem.

26 Claims, 3 Drawing Sheets

DRILLING RIG SYSTEM HAVING IMPROVED ELECTRICAL SUBSYSTEM

CROSS-REFERENCE TO RELATED APPLICATIONS

This application is a continuation-in-part of co-pending U.S. application Ser. No. 14/554,882 filed on Nov. 26, 2014, which is herein incorporated by reference in its entirety for all purposes.

FIELD OF THE INVENTION

The disclosure relates to improved drilling rig systems, such as for drilling wells at plural discrete locations at a drilling site. Those of ordinary skill will appreciate that need exists for drilling rig systems having an improved electrical subsystem.

BACKGROUND OF THE INVENTION

The disclosure relates to improved drilling rig systems, such as for drilling wells at plural discrete locations at a drilling site. Those of ordinary skill will appreciate that need exists for drilling rig systems having an improved electrical subsystem.

BRIEF SUMMARY OF THE INVENTION

Embodiments provide a drilling rig system that may have a stationary primary power subsystem and movable rig unit that can be relocated across a foundation pad 20 between plural discreet drilling locations at a drilling site. A drilling rig system can include only a single intermediate conductor, or a single composite intermediate cable structure, extending between a stationary primary power subsystem and movable rig unit. Embodiments provide a drilling rig system that may have a stationary primary power subsystem and movable rig unit with a single power conductor member extending therebetween that is simplified and of reduced size and number, and of improved reliability, and may provide for more efficient operation with reduced time and labor, and with improved safety. In embodiments, a drilling rig system may have a stationary primary power subsystem and a movable rig unit that can be relocated across foundation pad 20 between plural discreet drilling locations, and that can include only a single first releasable power connector assembly between a primary power supply subsystem and intermediate electrical subsystem, and only a second releasable power connector assembly between intermediate electrical subsystem and a rig electrical subsystem of the movable rig unit, and that are simplified and of reduced size and number, and of improved reliability, and provide for more efficient operation with reduced time and labor, and with improved safety. Embodiments provide the advantages of eliminating numerous 600 voltage alternating current ("VAC") intermediate cables that would otherwise extend from a primary power supply subsystem to a movable rig unit. Embodiments provide for simplified and more efficient use of the foundation pad by personnel and mobile equipment, such as tow motors, at a drilling site without requiring personnel to navigate over or around, or to physically move and reposition and connect or disconnect a plurality of 600 VAC intermediate cables. Embodiments provide the benefit of eliminating numerous drag links and festoons for handling numerous intermediate cables when relocating the rig unit. Embodiments provide the benefit of eliminating numerous electrical plugs and receptacles, and thus reducing high maintenance and resulting maintenance and repair downtime for same. Embodiments provide the benefit of enabling use of 600 VAC equipment at the primary power supply subsystem and rig unit. Embodiments provide the benefit of eliminating a large number of power cables and draglinks or festoons necessary to hand long multiple cables, and minimizing the number of power connector assemblies and components, such as releasable plug and receptacle power connector assemblies. Embodiments provide the benefit that power can be transferred to a movable rig unit at 4160 VAC over a single three phase intermediate conductor or cable. Embodiments provide the benefit that a drawworks variable frequency drive (VFD), a top drive variable frequency drive and related control equipment can be included in a local equipment room (LER) that may be combined with the drillers control cabin on the movable rig unit. Embodiments provide the benefit that the control logic equipment for the drawworks, top drive and rig mounted equipment is located in the drillers control cabin and can communicate back via wire, fiber or wireless. Embodiments provide control wiring from rig mounted equipment that runs only a short distance from the rig equipment to the drilling control unit, such as from local equipment room (LER) of the driller's control cabin, and thus can eliminate or reduce communication problems associated with long control leads and numerous intermediate connections.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

Figure 1:
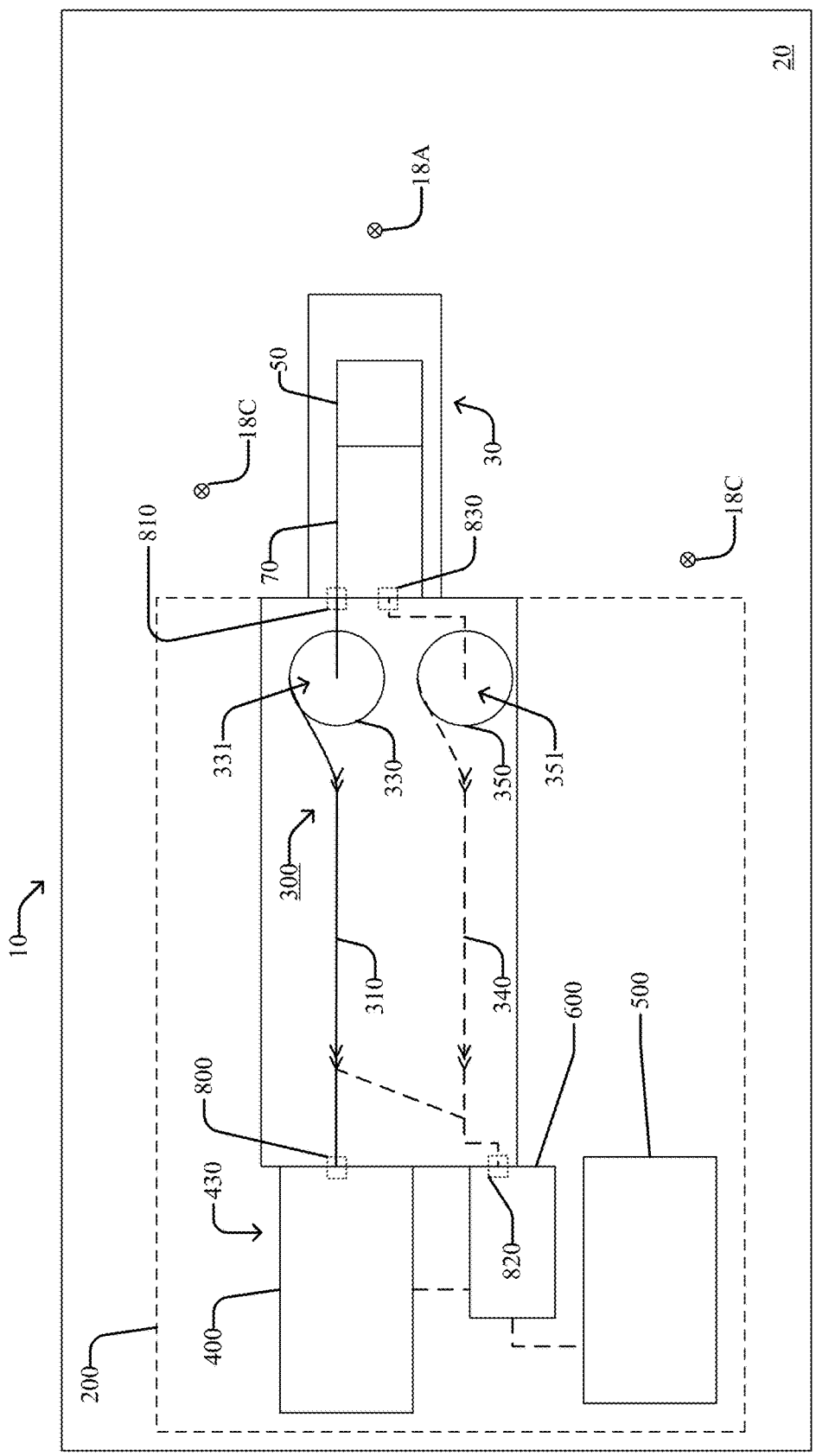
FIG. 1 is a schematic illustration of a drilling rig system 10 in an embodiment.

FIG. 1 is a schematic illustration of a drilling rig system 10 according to an embodiment. It will be understood that in other embodiments (not shown) a drilling rig system of different arrangement can practice subject matter herein disclosed.

Drilling rig system 10 is located at a drilling site. Referring to FIG. 1, the drilling site may include plural discrete drilling locations 18a, 18b, and 18c where wells are to be drilled. The drilling site may be, for example, a location where plural discrete hydrocarbon wells, located in close proximity to one another, are to be drilled. Wells located in close proximity to one another may be used to access different depths of a formation.

In the embodiment illustrated in FIG. 1, drilling rig system 10 may include a foundation pad 20 installed on the ground at the drilling site. Although foundation pad 20 can be arranged differently, and can have different dimensions, in the particular embodiment illustrated in FIG. 1, foundation pad 20 is substantially rectangular and spans the ground to encompass the plural discrete drilling locations 18a, 18b, 18c at the drilling site. Although different materials of construction can be used, in the embodiment illustrated in FIG. 1, foundation pad 20 is formed of concrete. It will be understood that in other arrangements, foundation pad 20 can be formed of any material that provides sufficient support for operation of drilling rig system 10.

Referring to FIG. 1, drilling rig system 10 includes rig unit 30 supported on foundation pad 20. Rig unit 30 may be configured and operable to perform drilling functions and operations. It will be understood that different embodiments of drilling rig system 10 can include any suitable rig unit 30, including rig units of different configurations, arrangements, and appearances, and can be of different manufacture. Rig unit 30 can include rig structure such as, for example, a mast (not shown) extending in a vertical direction above drilling location 18a where a respective well is to be drilled. It will be understood that rig unit 30 is relocatable or moveable across foundation pad 20 from drilling location 18a to be positioned for drilling wells at the other of the plural discrete drilling locations 18b and 18c. In the specific position illustrated in FIG. 1, rig unit 30 is positioned or located on foundation pad for drilling a well at drilling location 18a. It will be understood that rig unit 30 may include a relocation subsystem (not shown) configured for operation to enable relocation movement of rig unit 30 across foundation pad 20. A suitable relocation subsystem (not shown) may include, for example, a walking mechanism, a set of wheels, a set of tracks, or combinations thereof. It will be understood that the relocation subsystem may be configured and operable for moving or walking rig unit 30 across foundation pad 20 between the plural discrete drilling locations 18a, 18b, and 18c. Rig unit 30 may include a drilling floor (not shown) configured for personnel to stand and walk upon for performing rig work such as, for example, making up and breaking apart threaded connections between pipe joints, and changing out down-hole tools.

Figure 2:
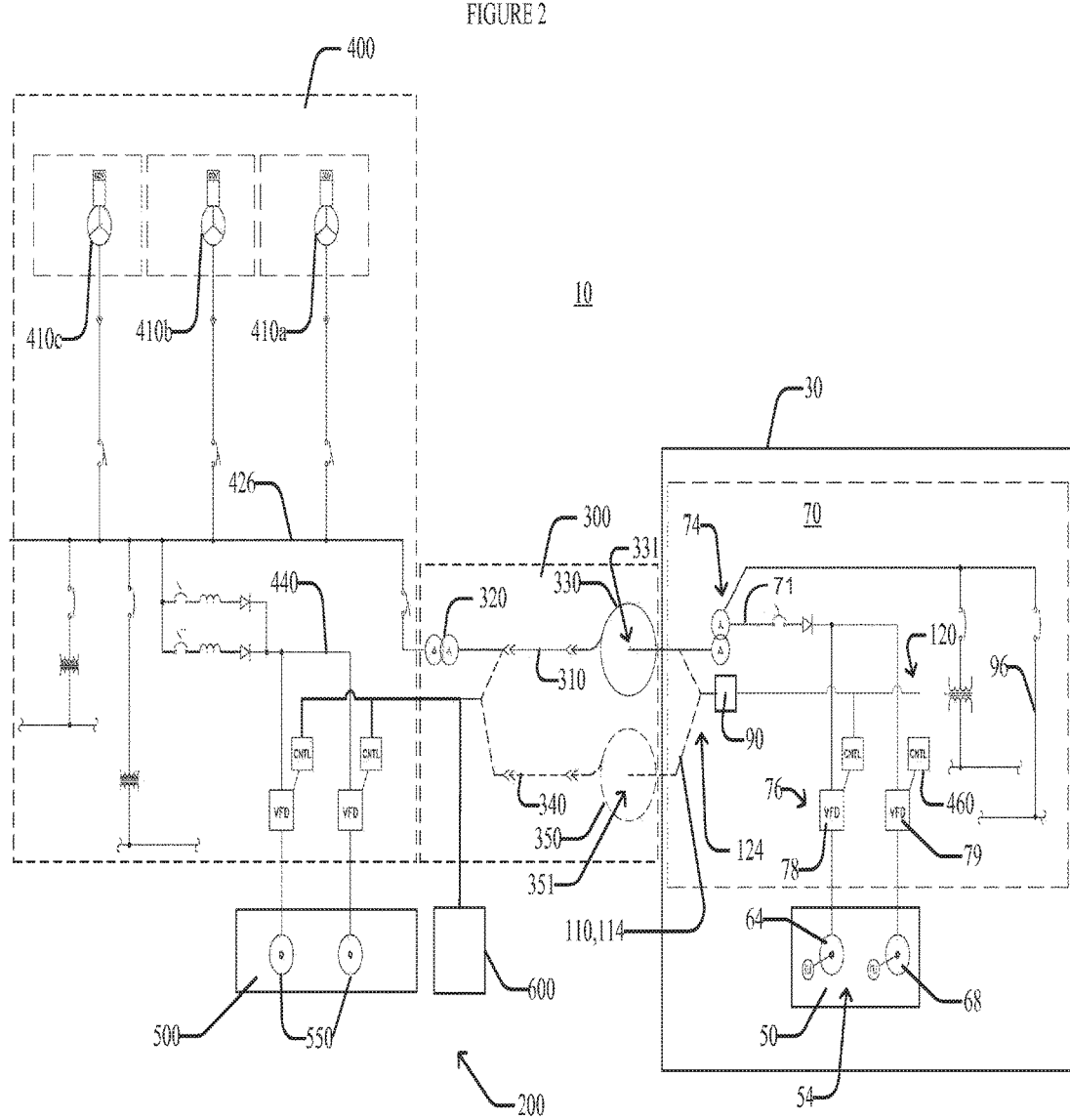
FIG. 2 is a one-line diagram of drilling rig system 10 in an embodiment illustrated in FIG. 1.

Referring to FIG. 1, rig unit 30 can include rig equipment 50 configured and operable to perform respective functions. It will be understood that rig equipment 50 can include electro-mechanical equipment 54 such as, for example, hydraulic equipment. The rig equipment 50 may include, by way of example and without limitation, top drives, hoists, draw works, pipe tongs, joint elevators, electro-mechanical equipment, wrenching equipment, electric motors, pumps, rotary tables, lifting equipment, and combinations thereof. Referring to FIG. 2, in an embodiment therein illustrated, rig equipment 50 includes top drive 64 and draw works 68.

Referring to FIG. 1, rig unit 30 can include rig electrical subsystem 70 configured for electrical communication with the rig equipment 50. It will be understood that the rig electrical subsystem can be configured to deliver power to rig equipment 50. Referring to FIG. 2, the rig electrical subsystem can include a rig electrical subsystem input transformer 74. In the specific embodiment illustrated in FIG. 2, rig electrical subsystem input transformer 74 can be located onboard rig unit 30. It will be understood that, in other arrangements (not shown), rig electrical subsystem input transformer 74 may be physically located off-board, in close physical proximity to the major structure of rig unit 30. The rig electrical subsystem input transformer 74 may be configured to receive intermediate power from an intermediate electrical subsystem 300. The rig electrical subsystem input transformer 74 is configured to transform intermediate power at high voltage to rig power at rig operating voltage, where the rig operating voltage is lower than the high voltage of the intermediate power. In the particular embodiment illustrated in FIG. 2, for example, rig electrical subsystem input transformer 74 is configured to transform intermediate power received from intermediate electrical subsystem 300 at 4160 VAC to rig power at rig operating voltage 600 VAC. It will be understood that the intermediate power or rig power can differ from the particular values set forth in the specific embodiments illustrated herein. In an embodiment illustrated in FIG. 2, rig electrical subsystem input transformer 74 can provide rig power at 600 VAC on a rig subsystem conductor 71. It will be understood that in embodiments (not shown), a rig electrical subsystem input transformer can provide rig power at 480 VAC on a rig subsystem conductor to rig equipment configured for operation at 480 VAC.

Referring to FIG. 2, rig electrical subsystem 70 may include a motor controller 76 for providing power to rig equipment 50 such as, or including, a respective electric motor. Any suitable motor controller may be used. In the specific embodiment illustrated in FIG. 2, motor controller 76 includes suitable variable frequency drive 78, 79. It will be understood that motor controller 76, such as variable frequency drive 78, 79, receives rig power and provides controlled power to respective rig equipment 50 such as, or including, a respective electric motor. In the particular embodiment illustrated in FIG. 2, variable frequency drive 78 is configured to deliver conditioned power to top drive 64 for enabling operation thereof. In the particular embodiment illustrated in FIG. 2, variable frequency drive 79 is configured to deliver conditioned power to draw works 68 for enabling operation thereof.

Referring to FIG. 2, rig electrical subsystem 70 may include rig control subsystem 90 configured for controlling functions and operations of rig equipment 50 and remote subsystems 200. Rig control subsystem 90 may include a data communications subsystem 110. It will be understood that data communications subsystem 110 may include a suitable data communications cable 114 in communication with data network equipment (not shown) such as, for example, one or more servers (not shown) and distributed data sources (not shown) such as, for example, remote sensor devices and network-enabled remote devices (not shown). Data communications cable 114 can extend, for example, from servers in a driller's cabin (not shown) on-board rig unit 30. Again referring to FIG. 2, data communications cable 114 can extend, for example, to data sources and network-enabled remote devices (not shown) located at rig equipment 50, motor controller 76, and variable frequency drive 78, 79 on-board rig unit 30. Data communications cable 114 can extend from rig unit 30 to off-board equipment and systems such as, for example, remote subsystems 200 including intermediate electrical subsystem 300, primary power subsystem 400 and mud pumping system 500.

Referring to FIG. 2, rig control subsystem 90 may include control circuits 120. It will be understood that control circuits 120 may include suitable control circuit cables 124 in low voltage electrical communication with controllable equipment (not shown). Controllable equipment can include, for example, one or more programmable logic controllers (PLC's), switches, and motor controllers such as, for example variable frequency drives. Control circuit cables 124 can extend, for example, from a drilling control unit in a driller's cabin on-board rig unit 30 to controllable equipment such as programmable logic controllers (PLC's), switches, and motor controllers such as variable frequency drives, located on-board rig unit 30. Control circuit cables 124 can extend from rig unit 30 to off-board equipment and systems such as, for example, remote subsystems 200 including intermediate electrical subsystem 300, primary power subsystem 400 and mud pumping system 500.

It will be understood that rig unit 30 may include a driller's control unit (not shown) that can enable a controls and information interface (not shown) for personnel such as a driller. In some embodiments, for example, a driller's control unit may be housed in a driller's control cabin (not shown). A driller's control unit can include rig equipment controls (not shown) and data communications subsystem equipment and controls (not shown) configured to enable control and operation of drilling rig system 10 including, for example, rig equipment 50 and remote subsystems 200. It will be understood that control and operations functions of drilling rig system 10, rig unit 30, rig equipment 50 and remote subsystems 200 may be performed by automated systems, or by automated systems under control, or partial control, of personnel such as a driller. It will be understood that a driller's control cabin may be configured to house a driller for operating a control interface, and may include a driller's control chair having, for example, one or more joystick-type input devices.

Referring to FIG. 2, it will be understood that rig electrical subsystem 70 may include tertiary circuits 96 in electrical communication with tertiary equipment (not shown) such as, for example, lights and other tertiary equipment.

Referring to FIG. 2, drilling rig system 10 includes primary power supply subsystem 400 remote from rig unit 30. In the particular embodiment illustrated in FIG. 2, the primary power supply subsystem 400 can be configured to provide primary power at 600 VAC (for example) to the intermediate electrical subsystem 300. It will be understood that primary power supply subsystem 400 in embodiments of disclosed subject matter can be of different configuration or arrangement from that specifically illustrated in FIG. 2. In embodiments as illustrated in FIG. 2, primary power supply subsystem 400 may include at least one primary generator 410a, 410b, 410c configured to provide primary power at 600 VAC (for example) to the intermediate electrical subsystem 300. In an embodiment the primary power supply subsystem 400 can include a powerhouse unit 430 (shown in FIG. 1), which may be skid-mounted, located on foundation 20 remote from the rig unit 30, wherein the powerhouse unit 430 includes the at least one primary generator 410a, 410b, 410c. In a particular embodiment illustrated in FIG. 2, primary power supply subsystem 400 may include three primary generators 410 configured to provide three-phase primary power at 600 VAC (for example) on primary conductor 420 to the intermediate electrical subsystem 300. It will be understood that primary power supply subsystem 400 can include a main Power Control Room (not shown).

It will be understood that in embodiments as illustrated in FIG. 2, primary power supply subsystem 400 can include mud system power line 440 configured to provide 600 VAC to mud pumping system 500. As shown in FIG. 2, mud pumping system 500 can include one or more mud pumps 550. Primary power subsystem 400 may include a suitable variable frequency drive 450, or other suitable motor controller as described herein for rig unit 30, configured for providing power to each mud pump 550 to enable operation thereof. It will be understood that respective controllers, such as PLC's 460, of control subsystem 600 can provide control and data communication with mud pumps 550, and with control and sensing elements of variable frequency drive 450. It will be understood that PLC's 460 can be in communication with the driller's cabin of rig unit 30 over control cabling as elsewhere described for sensing and controlling operation of mud pumps 550 and mud pumping system 500.

Referring to FIG. 2, in an embodiment drilling rig system 10 can include intermediate electrical subsystem 300 configured for electrical communication between the primary power supply subsystem 400 and the rig electrical subsystem 70. It will be understood that intermediate electrical subsystem 300 is configured to carry power from the primary power supply subsystem 400 to the rig electrical subsystem 70 for powering the rig equipment 50. In a particular embodiment illustrated in FIG. 2, the intermediate electrical subsystem 300 can be configured to provide intermediate power at 4160 VAC (for example) to the rig electrical power subsystem 70, and particularly to rig electrical subsystem input transformer 74 of same. It will be understood that intermediate electrical subsystem 300 in embodiments of disclosed subject matter can be of different configuration or arrangement from that specifically illustrated in FIG. 2. In embodiments as illustrated in FIG. 2, intermediate electrical subsystem 300 may include an intermediate conductor 310 configured to carry and provide intermediate power at 4160 VAC (for example) to the rig electrical subsystem 70. It will be understood that intermediate conductor 310 can include a single paired set of intermediate conductor members (not shown), wherein the paired set includes both a supply conductor member and a return conductor member (not shown). It will be understood, that in a particular embodiment as shown in FIG. 2, intermediate conductor 310 may be provided in a single intermediate conductor unit configured to carry 4160 VAC.

Referring to FIG. 2, in an embodiment intermediate electrical subsystem 300 can include an intermediate subsystem input transformer 320. In embodiments, intermediate subsystem input transformer 320 can be configured for electrical communication with the primary power supply subsystem 400 for receiving primary power therefrom at 600 VAC (for example) and for providing intermediate power at 4160 VAC on intermediate conductor 310. In an exemplary embodiment illustrated in FIG. 2, intermediate subsystem input transformer 320 can be located remote from rig unit 30 and in close proximity to primary power supply subsystem 400. It will be understood that, in other arrangements (not shown), intermediate subsystem input transformer 320 may be physically co-located on a skid structure with primary power supply subsystem 400, or in a common housing or cabinet structure with same. The intermediate subsystem input transformer 320 can be configured to receive primary power from primary power supply subsystem 400. The intermediate subsystem input transformer 320 can be configured to transform primary power at primary voltage to intermediate power at high voltage, where the primary voltage is lower than the high voltage of the intermediate power. In a particular embodiment as illustrated in FIG. 2, for example, intermediate subsystem input transformer 320 is configured to transform primary power received from primary power supply subsystem 400 at 600 VAC to intermediate power at 4160 VAC. It will be understood that the levels or voltage of intermediate power or primary power can differ from the particular values set forth in the specific embodiments illustrated herein.

Referring to FIG. 1, it will be understood that drilling rig system 10 can include a first releasable power connector assembly 800 configured for providing electrical communication between primary power supply subsystem 400 and intermediate electrical subsystem 300. A suitable first releasable power connector assembly 800 may include, for example, a plug and receptacle combination. It will be understood that, in embodiments as illustrated in FIG. 1, first releasable power connector assembly 800 can be configured for providing electrical communication between primary power supply subsystem 400 and intermediate electrical subsystem 300. It will be understood that, in a particular embodiment, first releasable power connector assembly 800 can be embodied by the electrical primary power supply subsystem 400 including a first releasable connector member (not shown) and by the intermediate electrical subsystem 300 including a second releasable connector member (not shown) configured for releasable mating engagement. Drilling rig system 10 can include a second releasable power connector assembly 810 configured for providing electrical communication between rig electrical subsystem 70 and intermediate electrical subsystem 300. It will be understood that, in embodiments as illustrated in FIG. 1, second releasable power connector assembly 810 can be configured for providing electrical communication between rig electrical subsystem 70 and intermediate electrical subsystem 300. It will be understood that, in a particular embodiment, second releasable power connector assembly 810 can be embodied by the rig electrical subsystem 70 including a first releasable connector member (not shown) and by the intermediate electrical subsystem 300 including a second releasable connector member (not shown) configured for releasable mating engagement. It will be understood that in embodiments, drilling rig system 10 can be differently configured to embody the subject matter and may include, for example, releasable power connector assemblies other than as specifically illustrated in FIG. 1.

Referring to FIG. 1, drilling rig system 10 may include conductor carrier reel 330 configured to carry intermediate conductor 310 in spooled relationship therewith. In embodiments as illustrated in FIG. 1, intermediate electrical subsystem 300 may include conductor carrier reel 330 configured to carry intermediate conductor 310 in spooled relationship therewith, wherein the conductor carrier reel 330 is supported for rotation about a conductor carrier reel axis 331 for playing the intermediate conductor 310 in spooled relationship relative thereto. In embodiments as illustrated in FIG. 2, conductor carrier reel 330 can be supported for relocation movement with the rig unit 30, wherein the conductor carrier reel 330 is configured for playing in the intermediate conductor 310 thereupon during relocation movement of the rig unit 30 across foundation pad 20 toward the primary power supply subsystem 400, and wherein the conductor carrier reel 330 is configured for playing out the intermediate conductor 310 therefrom during relocation movement of the rig unit 30 across foundation pad 20 away from the primary power supply subsystem 400. It will be understood that relocation movement of the rig unit 30 across foundation pad 20 can occur when moving the rig unit 30 between the plural discrete drilling locations 18*a*, 18*b*, 18*c* for drilling wells at the same. It will be understood that in embodiments of disclosed subject matter, the conductor carrier reel 330 at conductor carrier reel axis 331 can be supported in fixed relationship to the rig unit 30, wherein the conductor carrier reel 330 is configured for playing the intermediate conductor 310 spooled thereupon relative to the rig unit 30 during relocation of the rig unit 30 across the foundation pad 20. In embodiments as shown in FIG. 2, for example, the conductor carrier reel 330 can be supported by the rig unit 30 on a suitable frame (not shown), wherein conductor carrier reel axis 331 is supported in fixed relationship to the rig unit 30 for conductor carrier reel 330 to be relocated with rig unit 30. It will be understood that intermediate conductor 310 can extend from spooled relationship with conductor carrier reel 330 to provide electrical communication with rig electrical subsystem 70 at second releasable power connector assembly 810 (shown in FIG. 1).

Referring to FIG. 1, drilling rig system 10 may include control cabling carrier reel 350. In embodiments, intermediate power supply subsystem 300 may include discrete control cabling 340, wherein the discrete control cabling 340 is discrete from the intermediate conductor 310. It will be understood that discrete control cabling 340 may include at least one of: data communication cable 114 configured for communicating data between the rig unit 30 and remote subsystems 200 including equipment remote from the rig unit 30, and control circuit wiring 124 that may extend offboard from rig unit 30 for enabling control of remote subsystems 200 including equipment remote from the rig unit 30. As illustrated in FIG. 2, drilling rig system 10 may include intermediate power supply subsystem 300 including control cabling carrier reel 350 configured to carry the discrete control cabling 340 in spooled relationship therewith, wherein the control cabling carrier reel 350 is supported for rotation about a control cabling carrier reel axis 351 for playing the discrete control cabling 340 in spooled relationship relative thereto. In embodiments as illustrated in FIG. 2, control cabling carrier reel 350 can be supported for relocation movement with the rig unit 30, wherein the control cabling carrier reel 350 is configured for playing in the control cabling 340 thereupon during relocation movement of the rig unit 30 across foundation pad 20 toward the primary power supply subsystem 400, and wherein the control cabling carrier reel 350 is configured for playing out control cabling 340 therefrom during relocation movement of the rig unit 30 across foundation pad 20 away from the primary power supply subsystem 400. It will be understood that relocation movement of the rig unit 30 across foundation pad 20 can occur when moving the rig unit 30 between the plural discrete drilling locations 18*a*, 18*b*, 18*c* for drilling wells at the same. It will be understood that in embodiments of disclosed subject matter, the control cabling carrier reel 350 at conductor carrier reel axis 351 can be supported in fixed relationship to the rig unit 30, wherein the control cabling carrier reel 350 is configured for playing the control cabling 340 spooled thereupon relative to the rig unit 30 during relocation of the rig unit 30 across the foundation pad 20. In embodiments as shown in FIG. 2, for example, the control cabling carrier reel 350 can be supported by the rig unit 30 on a suitable frame (not shown), wherein control cabling carrier reel axis 351 is supported in fixed relationship to the rig unit 30 for control cabling carrier reel 350 to be relocated with rig unit 30. It will be understood that control cabling 340 can extend from spooled relationship with control cabling carrier reel 350 to provide electrical control circuit and data communication with rig electrical subsystem 70 at a first releasable control connector assembly 830 (shown in FIG. 1). It will be understood that control cabling 340 can extend from spooled relationship with control cabling carrier reel 350 to provide electrical control circuit and data communication with elements of remote control subsystem 600 at a second releasable control connector assembly 820 (shown in FIG. 1).

Figure 3:
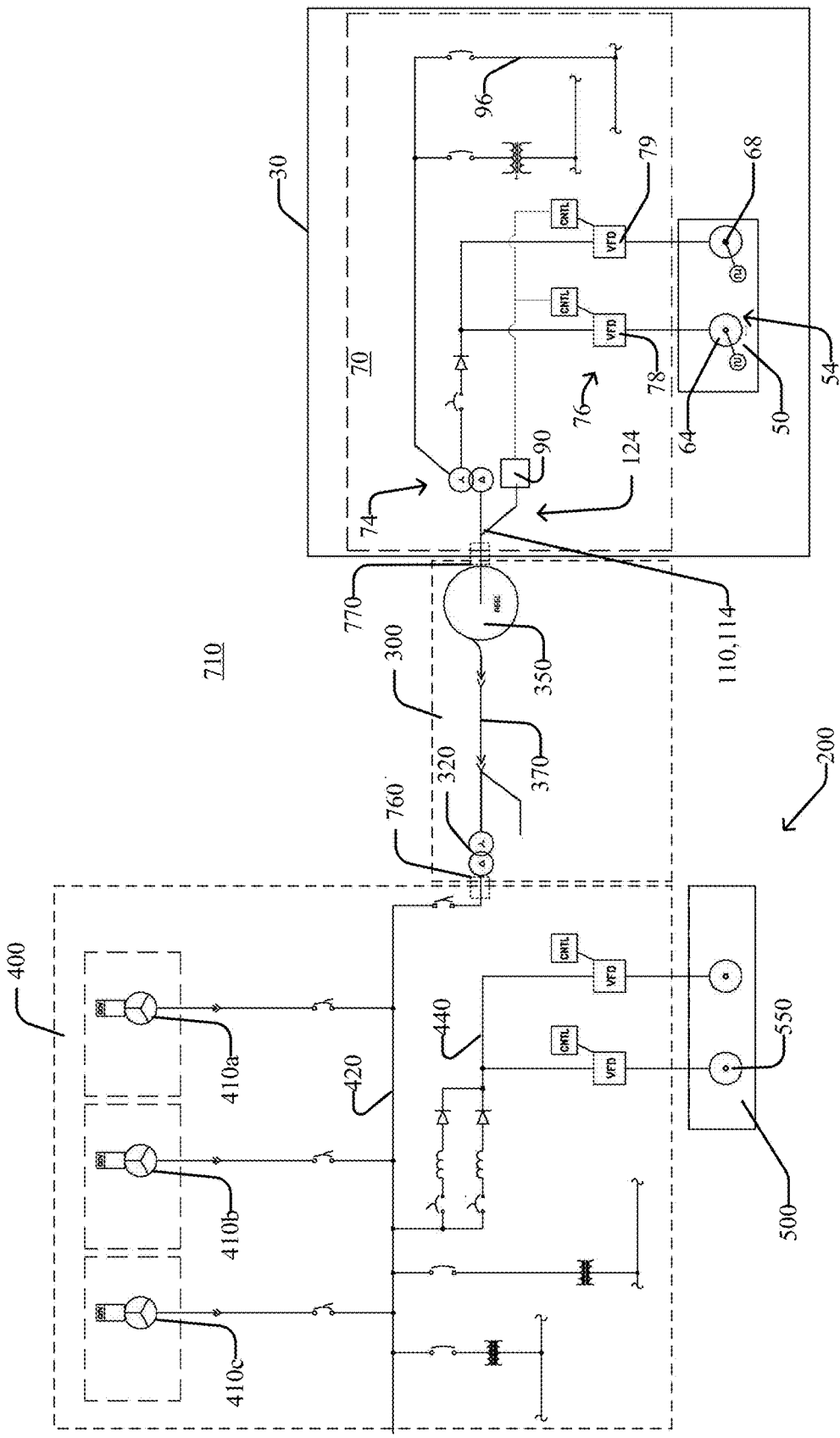
FIG. 3 is a one-line diagram of a drilling rig system 710 in an embodiment.

An exemplary embodiment of a drilling rig system 710 is illustrated in FIG. 3. It will be understood that drilling rig system 710 may be substantially identical to drilling rig system 10 (shown in FIG. 1 and FIG. 2) except as otherwise described in this paragraph or shown in FIG. 3. Drilling rig system 710 can include intermediate power supply subsystem 300 including composite intermediate cable structure 370. The composite intermediate cable structure 370 can include both intermediate conductor and control cabling. It will be understood that intermediate conductor can be substantially identical to intermediate conductor 310 of drilling rig system (shown in FIGS. 1 and 2). It will be understood that control cabling can be substantially identical to discrete control cabling 340 of drilling rig system 10 (shown in FIGS. 1 and 2). It will be understood that drilling rig system 710 may include a first composite releasable power and control connector assembly 760 configured to provide electrical communication, and control circuit and data communication, from remote subsystems 200 including primary power supply subsystem 400 to intermediate electrical subsystem 300. It will be understood that drilling rig system 710 may include a second composite releasable power and control connector assembly 770 configured to provide electrical communication, and control circuit and data communication, from to intermediate electrical subsystem 300 to rig electrical system 70. It will be understood that drilling rig system 710 may include a conductor carrier reel 350 configured to carry the composite intermediate cable structure 370 in spooled relationship therewith. It will be understood that the conductor carrier reel 350 can be supported for rotation for playing the composite intermediate cable structure 370 in spooled relationship relative thereto.

Embodiments provide a drilling rig system having a stationary primary power subsystem 400 and movable rig unit 30 that can be relocated across foundation pad 20 between plural discreet drilling locations 18a, 18b, 18c that can include only a single intermediate conductor 310, or a single composite intermediate cable structure 370 extending between stationary primary power subsystem 400 and movable rig unit 30. Embodiments provide a drilling rig system having a stationary primary power subsystem 400 and movable rig unit 30 with a single power conductor member therebetween that is simplified and of reduced size and number, and of improved reliability, and provide for more efficient operation with reduced time and labor, and with improved safety. Embodiments similarly provide a drilling rig system having a stationary primary power subsystem 400 and movable rig unit 30 that can be relocated across foundation pad 20 between plural discreet drilling locations 18a, 18b, 18c that can include only a single first releasable power connector assembly between primary power supply subsystem 400 and intermediate electrical subsystem 300, and only a second releasable power connector assembly between intermediate electrical subsystem 300 and rig electrical subsystem 70 of movable rig unit 30, that are simplified and of reduced size and number, and of improved reliability, and provide for more efficient operation with reduced time and labor, and with improved safety. Embodiments provide the advantages of eliminating numerous 600 VAC intermediate cables that would otherwise extend from primary power supply to a movable rig unit. Embodiments provide for simplified and more efficient use of the foundation pad by personnel and mobile equipment, such as tow motors, at a drilling site without requiring personnel to navigate over or around, or to physically move and reposition and connect or disconnect a plurality of such 600 VAC intermediate cables. Embodiments provide the benefit of eliminating numerous drag links and festoons for handling numerous intermediate cables when relocating the rig unit. Embodiments provide the benefit of eliminating numerous electrical plugs and receptacles, and thus reducing high maintenance and resulting maintenance and repair downtime for same. Embodiments provide the benefit of enabling use of 600 VAC equipment at the primary power supply subsystem and rig unit. Embodiments provide the benefit of eliminating a large number of power cables and draglinks or festoons necessary to hand long multiple cables, and minimizing the number of power connector assemblies and components, such as releasable plug and receptacle power connector assemblies. Embodiments provide the benefit that power can be transferred to the rig at 4160 VAC over a single three phase intermediate conductor or cable. Embodiments provide the benefit that a drawworks variable frequency drive (VFD), a top drive variable frequency drive and related control equipment can be included in a local equipment room (LER) that may be combined with the drillers control cabin for movement with the rig unit. Embodiment provide the benefit that the control logic equipment for the drawworks, top Drive and rig mounted equipment is located in the drillers control cabin and can communicate back via wire, fiber or wireless. Embodiments provide control wiring from rig mounted equipment that runs only a short distance from the rig equipment to the drilling control unit, local equipment room (LER) of the driller's control cabin, and thus can eliminate or reduce communication problems associated with long control leads and numerous intermediate connections.

The invention claimed is:

1. A drilling rig system comprising:
a movable drilling rig unit comprising:
a mast,
rig equipment;
a rig electrical subsystem configured for electrical communication with the rig equipment, the rig electrical subsystem configured to deliver power to the rig equipment, the rig electrical subsystem comprising a rig electrical subsystem input transformer; and
a relocation subsystem configured to relocate the movable drilling rig unit between plural discrete drilling locations; and
an electrical system comprising:
a primary power supply subsystem remote from the movable drilling rig unit, wherein the primary power supply remains stationary during movement of the movable drilling rig unit between plural discrete drilling locations; and
an intermediate electrical subsystem configured to carry electrical power from the primary power supply subsystem to the rig electrical subsystem, the intermediate electrical subsystem comprising an intermediate conductor configured to carry 4160 VAC.

2. A drilling rig system according to claim 1 and further comprising:
the primary power supply subsystem configured to provide 600 VAC to the intermediate electrical subsystem.

3. A drilling rig system according to claim 1 and further comprising:
the primary power supply subsystem comprising at least one primary generator configured to provide 600 VAC to the intermediate electrical subsystem.

4. A drilling rig system according to claim 3 and further comprising:
the primary power supply subsystem comprising a powerhouse unit remote from the rig unit, the powerhouse unit comprising the at least one primary generator.

5. A drilling rig system according to claim 1 and further comprising:
the intermediate electrical subsystem comprising an intermediate subsystem input transformer configured for electrical communication with the primary power supply subsystem for receiving primary power therefrom, the intermediate subsystem input transformer configured to provide 4160 VAC on the intermediate conductor.

6. A drilling rig system according to claim 5 and further comprising:
the intermediate subsystem input transformer configured to transform primary power at 600 VAC to provide 4160 VAC on the intermediate conductor.

7. A drilling rig system according to claim 1 and further comprising:
the rig electrical subsystem input transformer configured for electrical communication with the intermediate electrical subsystem for receiving intermediate power therefrom at 4160 VAC.

8. A drilling rig system according to claim 7 and further comprising:
the rig electrical subsystem input transformer configured to transform intermediate power at 4160 VAC to provide 600 VAC to a rig subsystem conductor.

9. A drilling rig system according to claim 1 and further comprising:
a conductor carrier reel configured to carry the intermediate conductor, the conductor carrier reel supported for rotation about a conductor carrier reel axis.

10. A drilling rig system according to claim 9 and further comprising:
the conductor carrier reel configured for playing in the intermediate conductor thereupon during relocation movement of the rig unit toward the primary power supply subsystem, the conductor carrier reel configured for playing out the intermediate conductor therefrom during relocation movement of the rig unit away from the primary power supply subsystem.

11. A drilling rig system according to claim 10 and further comprising:
the conductor carrier reel supported for relocation movement with the rig unit.

12. A drilling rig system according to claim 10 and further comprising:
wherein a foundation pad installed at the drilling site encompasses plural discrete drilling locations;
the rig unit supported on the foundation pad, the rig unit configured for relocation movement across the foundation pad between the plural discrete drilling locations for drilling wells at the plural discrete drilling locations;
the conductor carrier reel axis supported in fixed relationship to the rig unit, the conductor carrier reel configured for playing the intermediate conductor spooled thereupon relative to the rig unit during relocation of the rig unit across the foundation pad.

13. A drilling rig system according to claim 10 and further comprising:
the conductor carrier reel supported by the rig unit.

14. A drilling rig system according to claim 10 and further comprising:
wherein the relocation subsystem comprises a walking mechanism, or a set of wheels, or a set of tracks, or combinations thereof.

15. A drilling rig system according to claim 9 and further comprising:
the intermediate power supply subsystem comprising a composite intermediate cable structure, the composite intermediate cable structure comprising the intermediate conductor, the composite intermediate cable structure further comprising control cabling, the control cabling comprising at least one of the following:
data communication cable configured for communicating data between the rig unit and equipment remote from the rig unit, and control circuit wiring for enabling control of equipment remote from the rig unit;
the conductor carrier reel configured to carry the composite intermediate cable structure in spooled relationship therewith, the conductor carrier reel supported for rotation about a conductor carrier reel axis for playing the composite intermediate cable structure in spooled relationship relative thereto.

16. A drilling rig system according to claim 15 and further comprising:
the rig unit comprising a drillers control unit, the control cabling configured for communication with the drillers control unit.

17. A drilling rig system according to claim 9 and further comprising:
the intermediate power supply subsystem further comprising discrete control cabling, the discrete control cabling being discrete from the intermediate conductor, the discrete control cabling comprising at least one of the following:
data communication cable configured for communicating data between the rig unit and equipment remote from the rig unit, and
control circuit wiring for enabling control of equipment remote from the rig unit;
a control cabling carrier reel configured to carry the discrete control cabling in spooled relationship therewith, the control cabling carrier reel supported for rotation about a control cabling carrier reel axis for playing the discrete control cabling in spooled relationship relative thereto.

18. A drilling rig system according to claim 17 and further comprising:
the rig unit comprising a drillers control unit, the control cabling configured for communication with the drillers control unit.

19. A drilling rig system according to claim 1 and further comprising:
the rig electrical subsystem comprising a variable frequency drive configured to deliver power to the rig equipment.

20. A drilling rig system according to claim 19 and further comprising:
the rig equipment comprising the following:
top drive, hoist, draw works, pipe tong, joint elevator, electro-mechanical equipment, wrench, electric motor, hydraulic equipment, rotary table, lift equipment, and combinations thereof.

21. A drilling rig system comprising:
a movable drilling rig unit comprising:
a mast,
rig equipment;
a rig electrical subsystem configured for electrical communication with the rig equipment, the rig electrical subsystem configured to deliver power to the rig equipment, the rig electrical subsystem comprising a rig electrical subsystem input transformer; and
a relocation subsystem configured to relocate the movable drilling rig unit between plural discrete drilling locations; and
an electrical system comprising:
a primary power supply subsystem remote from the movable drilling rig unit, wherein the primary power supply remains stationary during movement of the movable drilling rig unit between plural discrete drilling locations; and an intermediate electrical subsystem configured to carry electrical power from the primary power supply subsystem to the rig electrical subsystem, the intermediate electrical subsystem comprising a single three-phase conductor.

22. The drilling rig system of claim 21, wherein the single three-phase conductor is configured to carry all of the electrical power delivered to the rig electrical subsystem from the primary power supply subsystem.

23. The drilling rig system of claim 21, wherein the single three-phase conductor is configured to carry 4160 VAC.

24. A drilling rig system comprising:

a movable drilling rig unit comprising:

a mast, rig equipment;

a rig electrical subsystem configured for electrical communication with the rig equipment, the rig electrical subsystem configured to deliver power to the rig equipment, the rig electrical subsystem comprising a rig electrical subsystem input transformer; and a relocation subsystem configured to relocate the movable drilling rig unit between plural discrete drilling locations;

an electrical system comprising:

a primary power supply subsystem remote from the movable drilling rig unit, wherein the primary power supply remains stationary during movement of the movable drilling rig unit between plural discrete drilling locations; and an intermediate electrical subsystem comprising an intermediate conductor configured to carry electrical power from the primary power supply subsystem to the rig electrical subsystem; and a conductor carrier reel configured to carry the intermediate conductor, the conductor carrier reel supported for rotation about a conductor carrier reel axis for playing in the intermediate conductor during relocation movement of the rig unit toward the primary power supply subsystem and for playing out the intermediate conductor during relocation movement of the rig unit away from the primary power supply subsystem.

25. The drilling rig system of claim 24, wherein the intermediate conductor is a three-phase conductor configured to carry all of the electrical power delivered to the rig electrical subsystem from the primary power supply subsystem.

26. The drilling rig system of claim 25, wherein the three-phase conductor is configured to carry 4160 VAC.

\* \* \* \* \*

(12) INTER PARTES REVIEW CERTIFICATE (1787th)
United States Patent (10) Number: US 9,644,431 K1
Myers et al. (45) Certificate Issued: May 28, 2020

(54) DRILLING RIG SYSTEM HAVING IMPROVED ELECTRICAL SUBSYSTEM

(71) Applicants: Norman S. Myers; David Carroll

(72) Inventors: Norman S. Myers; David Carroll

(73) Assignee: ORION HOLDCO LLC

Trial Numbers:

IPR2018-00603 filed Feb. 12, 2018
IPR2018-00604 filed Feb. 12, 2018

Inter Partes Review Certificate for:

Patent No.: 9,644,431
Issued: May 9, 2017
Appl. No.: 14/593,776
Filed: Jan. 9, 2015

The results of IPR2018-00603 and IPR2018-00604 are reflected in this inter partes review certificate under 35 U.S.C. 318(b).

INTER PARTES REVIEW CERTIFICATE
U.S. Patent 9,644,431 K1
Trial No. IPR2018-00603
Certificate Issued May 28, 2020

AS A RESULT OF THE INTER PARTES REVIEW PROCEEDING, IT HAS BEEN DETERMINED THAT:

Claims 1-26 are found patentable.

\* \* \* \* \*